JAMES W. ROSS
MARTIN S. FRANT
INVENTORS.

BY

Robert J. Schiller

ATTORNEY.

United States Patent Office 3,591,464
Patented July 6, 1971

3,591,464
METHOD AND APPARATUS FOR DETECTING IONIC ACTIVITY
Martin S. Frant and James W. Ross, Newton, Mass., assignors to Orion Research, Inc., Cambridge, Mass.
Filed Sept. 6, 1968, Ser. No. 757,848
Int. Cl. G01n 27/46
U.S. Cl. 204—1T                                 40 Claims

ABSTRACT OF THE DISCLOSURE

A potentiometric, solid state membrane type electrode for detecting ion activities in solution and in which electrode the ion-sensitive element is an imporous solid membrane having a surface intended to contact the solution. The surface comprises an intimate mixture of $Ag_2S$ and another compound selected according to the nature of the ion to which the element is to be responsive. For copper, lead, cadmium and thiocyanate sensitive elements, the latter compound is respectively CuS, PbS, CdS and AgSCN. One form of the membrane is a compressed coprecipitate of the requisite salts free of the metals of which the salts are formed.

---

This invention relates to electrochemical detection and measurement, and more particularly to novel means for determining and measuring the presence of specific ions in solution.

Presently, qualitative and quantitative determination of the presence of such ions as $Cu^{++}$, $Cd^{++}$, $Pb^{++}$, and $SCN^-$ is generally made by spectrophotometric or colorimetric techniques, or by the usual chemical tests using a variety of reagents. These prior art methods do not lend themselves readily to continuous, real-time monitoring and usually require sampling.

The present invention contemplates an improved system for detecting and measuring the presence of such ions in solution through novel potentiometric electrodes.

Further objects of the present invention are to provide an electrode of the type described which permits direct on-stream monitoring of ion activity; to provide such an electrode which yields a continuous signal output voltage having a simple logarithmic relation to ion activity with sufficiently fast response time to permit readings to be made substantially in real time; to provide such an electrode which is rugged and in which the ion-sensitive portion or element is a solid-state membrane; to provide an electrode of the type described sensitive to cupric ions in a stable and reproducible manner substantially free from interference from most other common ions including hydrogen ion; to provide an electrode of the type described particularly sensitive to cadmium ions; to provide an electrode of the type described particularly sensitive to lead ions; and to provide an electrode of the type described particularly sensitive to thiocyanate ions.

Yet other objects of the invention will in part be obvious and will in part appear hereinafter. The invention accordingly comprises the apparatus possessing the construction, combination of elements, and arrangement of parts, and comprises the several steps and the relation of one or more of such steps with respect to each of the others, all of which are exemplified in the following detailed disclosure, and the scope of the application of which will be indicated in the claims.

Figure 1:
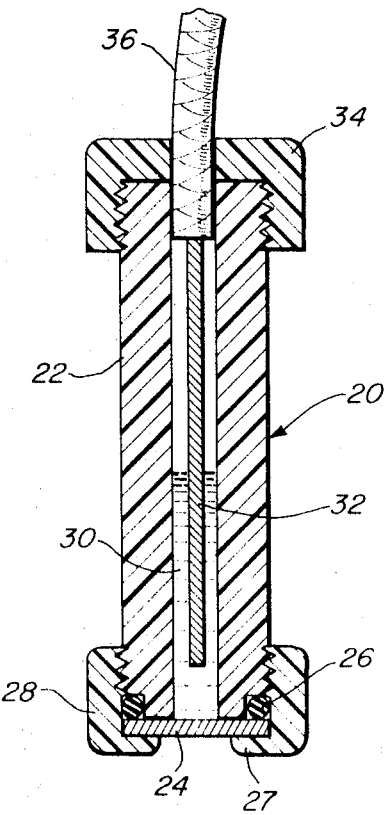
Figure 2:
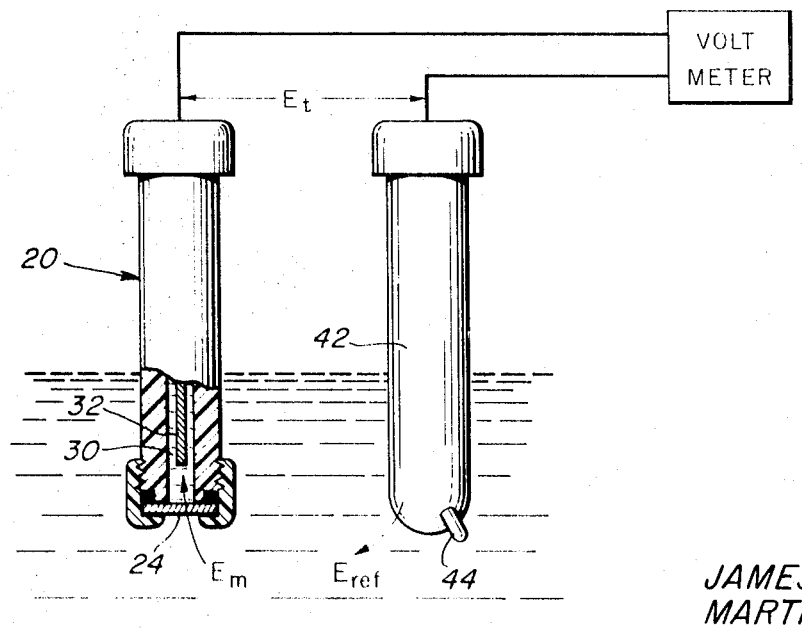

For a fuller understanding of the nature and objects of the present invention, reference should be had to the following detailed description taken in connection with the accompanying drawings wherein:

FIG. 1 shows a schematic, side-elevational, cross-sectional simplified view of an electrode embodying the principles of the present invention; and FIG. 2 is a schematic, side-elevational view, partly in cross-section of a cell employing the electrode of FIG. 1 for the detection of ions.

Generally, the foregoing and other objects of the present invention are effected by providing an electrode having an ion-sensitive element in the form of a substantially imporous membrane of silver sulfide intimately and substantially uniformly mixed with another compound, the membrane being substantially free of silver and of the metals of which the other compounds are formed, at least on the surface thereof intended to contact a solution under test For electrodes sensitive respectively to $Cu^{++}$, $Cd^{++}$, $Pb^{++}$, and $SCN^-$, the corresponding compounds mixed with the $Ag_2S$ are respectively CuS, CdS, PbS and AgSCN. The presence of free metals in the membrane surfaces tends to make the corresponding electrode drifty and susceptible to interferences from redox couples that might exist in the sample solutions under test. Thus, electron transfer reactions of the type $Cu^{++}+2e \rightarrow Cu$, or $Fe^{++} \rightarrow Fe^{+++}+e$, and the like, are not pertinent to the present invention inasmuch as there is substantially no free metal present which will enter such reaction or act as a source or sink of electrons. The term "membrane" as used herein, consistent with its usual usage in potentiometric electrode technology, is intended to embrace a sheet-like structure, generally regardless of its flexibility or curvature, which primarily provides a pair of surfaces between which ionic charge transfer is effected.

Referring now to the drawing there is shown in FIG. 1 electrode 20 embodying the principles of the present invention and comprising an elongated, hollow tubular container or stem 22 open at both ends. The stem typically is formed of an liquid-impervious, substantially rigid, electrically-insulating material, such as unplasticized polyvinylchloride, polytetrafluorethylene, glass or the like, substantially chemically inert to solutions being tested and with which the stem might be placed in contact.

One end of the stem 22 is capped or sealed with a barrier disc or membrane 24 which will be described in detail later herein. Membrane 24 can be quite thick, for example, ¼", although thinner structures are preferred. Membrane 24 can be sealed across the one end of stem 22 with an appropriate sealing compound such as an epoxy resin, but advantageously, as shown, is mounted on O-ring 26 disposed about the periphery of the opening in the stem, and held in a pressed-fit against the O-ring by annular flange 27 of collar 28 threadedly mounted on the stem. When collar 28 is rotated in the proper direction, it advances axially, forcing membrane 24 in a tight fit against the O-ring, thus sealing the one end of stem 22. Both the O-ring and collar 28 are preferably made of a plastic material such as polyvinylchloride.

Disposed internally of stem 22 and in electrical and physical contact with the inner surface of membrane 24 is charge transfer means providing a fixed concentration of silver either in metallic or ionic form. This means is shown as a reference electrolyte 30, for example, an aqueous saturated solution of various salts as described hereinafter. Immersed in electrolyte 30 is internal reference electrode 32, for example the well-known Ag-AgCl element. This combination of electrolyte 30 and reference electrode 32 provides means for electrically contacting the internal face (i.e. the surface of the membrane contacting the electrolyte) at a substantially stable or fixed potential.

The other open end of stem 22 is fitted with annular cap 34 having an aperture in which is sealed the usual coaxial cable 36, the central conductor of which is connected to internal reference electrode 32 and the peripheral conductor of which is intended to provide electrostatic shielding.

The more important considerations in fabricating the electrode of FIG. 1 lie in the structure of membrane 24. The other elements and the shape and size of the electrode are not particularly critical and can be selected according to the anticipated use.

Silver sulfide is unusual in that, not only is it highly insoluble in water ($K_{sp}$ $10^{-52}$) but in at least its low temperature ($\beta$) form has a relatively low electrical bulk-resistivity coupled with exceptionally high cationic conductivity, i.e. electrical conductivity through the silver sulfide crystal lattice is effected primarily by migration of silver ions instead of by a conduction mechanism involving sulfide ions or electrons.

The membranes of the present invention are formed of silver sulfide intimately and uniformly mixed with another compound selected according to the desired response of the electrode. In the case where it is wished to have the electrode respond to cupric ions, the ratio of mole percentages of cupric sulfide to silver sulfide are in the range between 95% CuS/5% $Ag_2S$ to 1% CuS/99% $Ag_2S$. Where it is desired to provide an electrode sensitive to $Cd^{++}$, the mixture is formed of $Ag_2S$ and CdS, the ratio of mole percentages varying from 70% CdS/30% $Ag_2S$ to 10% CdS/90% $Ag_2S$. If the electrode is to be sensitive to $Pb^{++}$, the ratio of mole percentages of a mixture of PbS and $Ag_2S$ can vary between 70% PbS/30% $Ag_2S$ to 1% PbS/99% $Ag_2S$. Lastly, where the electrode is intended to be sensitive to $SCN^-$, then the membrane is formed of a mixture with a ratio of mole percentages between 75% AgSCN/25% $Ag_2S$ and 5% AgSCN/95% $Ag_2S$.

The following are examples of the preparation of the membranes used in the invention, and the responses of electrodes using such membranes. Where the response is noted as being Nernstian, it is intended to indicate that the ion-sensitive membrane responds substantially in accordance with the well-known Nernst equation in a stable and reproducible manner.

EXAMPLE I

Solutions of 0.1 M $AgNO_3$ and 0.1 M $Cu(NO_3)_2$ were mixed in the desired ratio. This mixture was then added to a stoichiometric excess of $Na_2S$, and the precipitate formed was allowed to settle for about an hour. The order of mixing of the compounds is important insofar as it insures that the copper and silver salts are intimately intermixed in solution first, and the resulting sulfide precipitated is equally intimately mixed. The addition of the mixture of copper and silver salts to $Na_2S$, rather than the latter to the mixture, is quite important in order to avoid preferential precipitation of $Ag_2S$.

After the precipitate has settled, the slurry was then decanted, fresh distilled water added, and the resulting slurry boiled for one to two hours. The steps of settling, decanting and washing in boiling water were repeated several times. Thereafter the precipitate was filtered out, washed with dilute nitric acid and with several washings of distilled water and finally dried under vacuum. The dried precipitate was slurried in $CS_2$ to dissolve any residual sulfur, filtered, washed with acetone and dried at 80–100° C. in air.

This final mixed powder, which contains substantially no sulfur nor free metal of the salts of which it is formed, was compressed, typically under 20,000 pounds in a ⅜″ diameter die, to form a pellet or membrane. Pressure was applied for about three minutes at room temperature, preferably under a moderate vacuum (i.e. 1 mm. of Hg) during compression.

A number of pellets of different mole percentage ratio were made and used in corresponding electrodes to measure a graded series of samples of concentrations of $Cu^{++}$ ion between $10^{-2}$ and $10^{-3}$ M. The composition of each and the corresponding characterization of the electrode response is as follows:

| Mole percent | | Response |
|---|---|---|
| CuS | $Ag_2S$ | |
| 99 | 1 | Excessively low slope. |
| 95 | 5 | Approximately Nernstian. |
| 90 | 10 | Do. |
| 30 | 70 | Do. |
| 10 | 90 | Do. |
| 5 | 95 | Do. |
| 1 | 99 | Do. |
| 0.1 | 99.9 | Reverse slope, unstable. |

EXAMPLE II

A number of pellets were formed according to the method described in Example I except that in place of $Cu(NO_3)_2$ the salt used was $Cd(NO_3)_2$, the mole percentage ratio and responses to a number of solutions of $Cd^{++}$ from $10^{-2}$ to $10^{-3}$ M being as follows:

| Mole percent | | Response |
|---|---|---|
| CdS | $Ag_2S$ | |
| 95 | 5 | Not working, cracked pellet. |
| 90 | 10 | Cracked pellet. |
| 70 | 30 | Approximately Nernstian. |
| 30 | 70 | Do. |
| 10 | 90 | Do. |
| 5 | 95 | Drifting, negative slope. |
| 1 | 99 | Unstable. |

EXAMPLE III

A number of pellets were formed according to the method of Example I except that $Pb(NO_3)_2$ was used in place of $Cu(NO_3)_2$. The mole percentage ratios and responses to test solution of $Pb^{++}$ were as follows:

| Mole percent | | Response |
|---|---|---|
| PbS | $Ag_2S$ | |
| 99 | 1 | Reverse slope, drifting, unstable. |
| 95 | 5 | Reverse slope. |
| 90 | 10 | Excessively low slope. |
| 70 | 30 | Approximately Nernstian. |
| 30 | 70 | Do. |
| 10 | 90 | Do. |
| 1 | 99 | Do. |
| 0.1 | 99.9 | Excessively low slope. |

EXAMPLE IV

Pellets were formed in a manner similar to the method described in Example I with the following differences: Aqueous solutions of 0.1 M KCSN and 0.1 M $Na_2S$ were mixed together, and then a solution $AgNO_3$ added thereto to effect complete precipitation.

The composition and response of each to solutions between $10^{-2}$ and $10^{-3}$ M $SCN^-$ were as follows:

| Mole percent | | Response |
|---|---|---|
| AgSCN | $Ag_2S$ | |
| 90 | 10 | Mechanically weak. |
| 75 | 25 | Approximately Nernstian. |
| 30 | 70 | Do. |
| 5 | 95 | Do. |
| 1 | 99 | Drifty. |

In each of the above examples the pellet obtained was comparatively dense and imporous.

Significantly, in each instance in the above examples, the compound mixed with $Ag_2S$, when tested alone as a pellet showed no ion-sensitivity at all to its own metal ions. This then leads one to postulate that the mechanism operating is quite different than found in known ion-sensitive membranes using a silver halide such as AgCl mixed with silver sulfide. For such membranes, the AgCl is known to be an ion-sensitive material and the responsiveness of the membrane is not due to its being mixed with $Ag_2S$, as surprisingly appears to be the case in the present invention.

Further, other divalent metal sulfides when mixed with $Ag_2S$ do not necessarily yield suitable membranes. For example, $ZnS/Ag_2S$ pellets had poor mechanical properties, being either crumbly or porous, and yielded very drifty, poor or absent voltage slopes in response to $Zn^{++}$. Pellets of $AgO/Ag_2S$ which might have been considered $OH^-$ responsive, showed no significant response to $OH^-$. Certain other matrix materials than $Ag_2S$, theoretically interesting, such as $LaF_3$, itself an ion-sensitive salt, when mixed with $CaF_2$ to form a pellet, conferred no significant sensitivity to $Ca^{++}$ on the pellet.

The copper electrodes (with $Ag_2S/CuS$ membranes) showed no interfering response due to the presence of $Fe^{++}$, $Ni^{++}$, $Zn^{++}$, $Cu^{++}$, $Na^+$, $K^+$ and $Mg^{++}$ in the test solution, all of which ions provide interferences with the response of prior art liquid membrane electrodes sensitive to $CU^{++}$. The only cation interferences appear to be from the presence of $Fe^{+++}$, $Ag^+$, $Hg_2^{++}$ and $Hg^{++}$. No hydrogen ion interference appears in $10^{-2}$ M $Cu^{++}$ solutions at pH as low as 1.0. High concentrations of $Br^-$ and $Cl^-$ (relative to $Cu^{++}$ present) cause some interference.

The lead-sensitive electrodes (using $PbS/Ag_2S$ membranes) are insensitive to the same ions as the copper-sensitive electrode, but show interference responses due to the presence of $Cu^{++}$, $Hg^{++}$, $Hg_2^{++}$ and $Ag^+$, but are not effected by $Fe^{+++}$, $Cl^-$ or $Br^-$.

The cadmium-sensitive electrode (using the $CdS/Ag_2S$ membrane) shows interference in response to the same ions as the lead-sensitive electrode as well as to $Pb^{++}$, and is insensitive to the same ions as the copper-sensitive electrode.

The thiocyanate electrode ($Ag_2S/AgSCN$ membrane) is subject to interferences primarily from $Br^-$, $I^-$, $S^=$, $Cn^-$, $Hg^{++}$ and $Hg_2^{++}$. As known in the art, the electrolytes used in the various electrodes are those which can contribute to providing the desired fixed reference potential and are typically, but not necessarily liquid. Hence, in the copper-sensitive electrode the preferred electrolyte typically is aqueous $10^{-3}$ M $Cu(NO_3)_2$ and $10^{-2}$ M NaCl; for the cadmium sensitive electrode, a 0.1 M solution of $CdCl_2$; for the lead-sensitive electrode, a solution of 0.01 M $Pb(NO_3)_2$ mixed with 0.001 M NaCl; and for the thiocyanate-sensitive electrode, 0.1 M $AgNO_3$ solution. In each instance, the internal reference electrode contacting the electrolyte can be the usual Ag/AgCl electrode, and of course, the electrolyte is saturated with respect to AgCl.

It can be postulated that the operative mechanism, (using the copper-sensitive electrode as exemplary) is as follows:

A membrane of $Ag_2S/CuS$ separating two solutions, one of which is a reference solution containing $Ag^+$ at a fixed concentration and the other of which is a sample solution under test, will develop a potential $E_m$ according to the well-known Nernst equation.

(1) $$E_m = C + \frac{RT}{F} \ln (Ag^+)$$

Where C, R, T and F are all the usual well-known values and where ($Ag^+$) is the silver ion activity in the test sample solution. However, since $Ag_2S$ is extremely insoluble, ($Ag^+$) is fixed by the presence of the solid salt and can be related to the sulfide activity ($S^=$) of the sample solution by use of the solubility product $K_{sp}$ of $Ag_2S$. Thus (2) $$(Ag^+)^2 = \frac{K_{(sp)}}{(S^=)}$$

Since CuS is more soluble than $Ag_2S$, the sulfide ion activity ($S^=$) is also fixed by the presence of the solid copper sulfide and can be related to the copper activity ($Cu^{++}$) through the solubility product $K'_{sp}$ of CuS as follows:

(3) $$(Cu^{++}) = \frac{K'_{(sp)}}{(S^=)}$$

Substituting Equation 3 in Equation 2, (4) $$Ag^+ = \left[ \frac{K_{sp}}{K'_{sp}} (Cu^{++}) \right]^{1/2}$$

Substituting Equation 4 into Equation 1 and simplifying (5) $$E_m = C' + \frac{RT}{2F} \ln (Cu^{++})$$

A similar postulate can readily be adduced with respect to the other membrane compositions of the present invention. The responses of the electrodes in a logarithmic manner substantially according to Equation 5 are obtained in practice in the following usual manner.

As shown in FIG. 2, electrode 20 of the present invention in use is placed so that the outer surface of membrane 24 contacts solution 40 under test (i.e. which contains the specie of ions sought to be detected). A standard reference electrode 42 is also placed in contact with solution 40.

Electrode 42 typically is the usual assembly housed in a conventional glass shell containing an Ag–AgCl electrode in saturated KCl–AgCl separated by an asbestos fiber junction from a 1 M NaOH solution. The latter solution occupies the lower end of the shell and is coupled to solution 40 through the usual fiber junction shown at 44. Both electrode 20 and electrode 42 are connected electrically to respective inputs of electrometric device 46, the latter being preferably the usual high-input impedance voltmeter.

In operation of the assembly of FIG. 2, a potential, $E_{ref}'$ of substantially fixed value (assuming constant temperature conditions) develops between reference electrode 42 and solution 40 independently of the ion concentration in the latter. Another potential, $E_m$, will develop across membrane 24 between internal electrolyte 30 and solution 40, but $E_m$ is independent or varies logarithmically according to the activity or concentration of ions in solution 40 in accordance with Equation 5. Because the potential, $E_{int}$, between reference electrode 32 and electrolyte 30 is also fixed, the total potential $E_t$, appearing between electrodes 42 and 20 will be the sum of $E_m$, $E_{ref}$ and $E_{int}$, and thus varies with $E_m$ only. $E_t$ can be readily measured on electrometric device 46, thus indicating the presence and activity of the desired ions in solution 40. An example of such measurement is as follows:

EXAMPLE V

An electrode, formed as described and incorporating a membrane of 70% $Ag_2S$/30% CuS, was used to measure activities of $Cu^{++}$ in a number of aqueous $Cu(NO_3)_2$ solutions of different, precisely serially diluted concentrations. Typically cell potentials are as follows for each solution of different concentration as follows:

| Conc. of $Cu^{++}$ in moles/liter: | Response in mv. |
|---|---|
| $1 \times 10^{-1}$ | 159 |
| $1 \times 10^{-2}$ | 131 |
| $1 \times 10^{-3}$ | 104 |
| $1 \times 10^{-4}$ | 77 |
| $1 \times 10^{-5}$ | 49 |
| $1 \times 10^{-6}$ | 21 |

Since certain changes may be made in the above apparatus and method without departing from the scope of the invention herein involved it is intended that all matter contained in the above description or shown in the accompanying drawing shall be interpreted in an illustrative and not in a limiting sense.

What is claimed is:

1. In an electrode for potentiometric determination of the activity of ions in solution, an element sensitive to selected ions and comprising a solid, substantially imporous membrane having a surface thereof adapted to contact said solution, said surface comprising a mixture of $Ag_2S$ with a compound selected from the group consisting of CuS, PbS, CdS and AgSCN, said surface being substantially free of silver and the metal of which said compound is formed.

2. An element as defined in claim 1 wherein said selected ions are copper ions and said compound is CuS.

3. An element as defined in claim 2 wherein said CuS is present in proportion to said $Ag_2S$ in a range of ratios, expressed in mole percentages, of between about 95:5 to about 1:99.

4. An element as defined in claim 1 wherein said selected ions are lead ions and said compound is PbS.

5. An element as defined in claim 4 wherein said PbS is present in proportion to said $Ag_2S$ in a range of ratios, expressed in mole percentages, of between about 70:30 to about 1:99.

6. An element as defined in claim 1 wherein said selected ions are cadmium ions and said compound is CdS.

7. An element as defined in claim 6 wherein said CdS is present inproportion to said $Ag_2S$ in a range of ratios, expressed in mole percentages, of between 70:30 and 10:90.

8. An element as defined in claim 1 wherein said selected ions are thiocyanate ions and said compound is AgSCN.

9. An element as defined in claim 8 wherein said AgSCN is present in proportion to said $Ag_2S$ in a range of ratios, expressed in mole percentages, of between about 75:25 and 5:95.

10. An element as defined in claim 1 wherein said membrane is a sheet of compressed particles of said $Ag_2S$ and said compound intimately mixed with one another.

11. The method of making the ion-sensitive portion of an electrode sensitive to ions in solution, comprising the steps of intimately and substantially uniformly mixing finely comminuted particles of the compound $Ag_2S$ with particles of a compound selected from the group consisting of CuS, CdS, PbS, and AgSCN; and compressing the mixture to form a substantially imporous membrane substantially free of the metals of which the compounds of said mixture are formed.

12. The method as defined in claim 11 wherein said compound is selected from the group consisting of CuS, CdS and PbS and said mixing is accomplished by preparing a mixed solution of soluble salts of silver and the metal of which said compound is formed, co-precipitating from said mixed solution the sulfides of silver and said metal, and recovering the precipitate.

13. The method as defined in claim 12 wherein said mixed solution is added to a stoichiometric excess of a soluble sulfide to effect coprecipitation.

14. The method as defined in claim 11 wherein said compound is AgSCN and said mixing is accomplished by preparing a mixed solution of a soluble sulfide and a soluble thiocyanate unreactive with one another, and coprecipitating from said mixed solution both $Ag_2S$ and AgSCN by adding thereto a solution of a soluble silver salt.

15. Potentiometric method of measuring the activity of ions in solution, and comprising the steps of
   contacting said solution with a reference electrode to establish a fixed contact potential;
   contacting said solution with a surface of a substantially imporous membrane, said surface comprising a mixture of $Ag_2S$ and another compound selected from the group consisting of CuS, PbS, CdS and AgSCN, said surface being substantially free of the metals of which the compounds of said mixture are formed,
   connecting the other surface of said membrane to electrically conductive means at a fixed contact potential; and
   measuring the total potential between said reference electrode and said conductive means.

16. In a potentiometric system for measuring the activity of ions in a solution with a reference electrode and an ion-sensitive electrode both contacting said solution and connected to a potential measuring device, wherein said ion-sensitive electrode includes, as the ion-sensitive element thereof a solid substantially imporous membrane having a surface thereof adapted to contact said solution, said surface comprising, an intimate mixture of $Ag_2S$ with a compound selected from the group consisting of CuS, PbS, CdS and AgSCN, said surface being substantially free of silver and the metal of which said selected compound is formed.

17. A system as defined in claim 16 wherein said membrane is a sheet of said mixture.

18. A system as defined in claim 16 wherein said ions to be measured are cupric ions and said compound is CuS.

19. A system as defined in claim 18 wherein said CuS is present in proportion to said $Ag_2S$ in a range of ratios, expressed in mole percentages, of between about 95:5 to about 1:99.

20. A system as defined in claim 16 wherein said ions to be measured are lead ions and said compound is PbS.

21. A system as defined in claim 20 wherein said PbS is present in proportion to said $Ag_2S$ in a range of ratios, expressed in mole percentages, of between about 70:30 to about 1:99.

22. A system as defined in claim 16 wherein said ions to be measured are cadmium ions and said compound is CdS.

23. A system as defined in claim 22 wherein said CdS is present in proportion to said $Ag_2S$ in a range of ratios, expressed in mole percentages, of between 70:30 and 10:90.

24. A system as defined in claim 16 wherein said ions to be measured are thiocyanate ions and said compound is AgSCN.

25. A system as defined in claim 24 wherein said AgSCN is present in proportion to said $Ag_2S$ in a range of ratios, expressed in mole percentages, of between about 75:25 and 5:95.

26. Potentiometric method of measuring the activity of ions in liquid solution, and comprising the steps of
   contacting said solution with a reference electrode to establish a fixed contact potential;
   contacting said solution with a surface of a substantially imporous membrane, said surface comprising a mixture of $Ag_2S$ and another compound selected from the group consisting of CuS, PbS, CdS and AgSCN;
   connecting the other surface of said membrane to electrically conductive means at a fixed contact potential; and
   measuring the total potential between said reference electrode and said conductive means.

27. A method as defined in claim 26 wherein said surface comprises a mixture of $Ag_2S$ and CuS.

28. A method as defined in claim 26 wherein said surface comprises a mixture of $Ag_2S$ and PbS.

29. A method as defined in claim 26 wherein said surface comprises a mixture of $Ag_2S$ and CdS.

30. A method as defined in claim 26 wherein said surface comprises a mixture of $Ag_2S$ and AgSCN.

31. In an electrode for potentiometric determination of the activity of ions in a liquid solution, an element sensitive to selected ions and comprising a solid, substantially imporous membrane having a surface layer thereof adapted to contact said solution, said surface layer comprising a mixture of $Ag_2S$ with a compound selected from the group consisting of CuS, CdS, and AgSCN.

32. An element as defined in claim 31 wherein said surface comprises a mixture of $Ag_2S$ and CuS.

33. An element as defined in claim 32 wherein said CuS is present in proportion to said $Ag_2S$ in a range of ratios, expressed in mole percentages, of between about 95:5 to about 1:99.

34. An element as defined in claim 31 wherein said surface comprises a mixture of $Ag_2S$ and CdS.

35. An element as defined in claim 34 wherein said CdS is present in proportion to said $Ag_2S$ in a range of ratios, expressed in mole percentages, of between 70:30 and 10:90.

36. An element as defined in claim 31 wherein said surface comprises a mixture of $Ag_2S$ and AgSCN.

37. An element as defined in claim 36 wherein said AgSCN is present in proportion to said $Ag_2S$ in a range of ratios, expressed in mole percentages, of between about 75:25 and 5:95.

38. A potentiometric system for measuring the activity of ions in a liquid solution with a reference electrode and an ion-sensitive electrode both contacting said solution and connected to a potential measuring device, wherein said ion-sensitive electrode includes, as the ion-sensitive element thereof a solid substantially imporous membrane having a surface layer thereof adapted to contact said solution, said surface layer comprising, an intimate mixture of $Ag_2S$ with a compound selected from the group consisting of CuS, PbS, CdS and AgSCN.

39. An element as defined in claim 38 wherein said surface comprises a mixture of $Ag_2S$ and PbS.

40. An element as defined in claim 39 wherein said PbS is present in proportion to said $Ag_2S$ in a range of ratios, expressed in mole percentages, of between about 70:30 to about 1:99.

References Cited

Kuikkola et al.: "J. of the Electrochemical Soc.," June 1957, pp. 379–387.

Skobets et al.: "J. of Gen. Chem.," vol. 10, Issue 17, 1940, pp. 1612–1620.

Noddack et al.: "Z. Elektrochem.," vol. 59, 1955, pp. 96–102.

TA-HSUNG TUNG, Primary Examiner

U.S. Cl. X.R.

23—79, 115, 134; 204—195; 264—109, 319

UNITED STATES PATENT OFFICE
CERTIFICATE OF CORRECTION

Patent No. 3,591,464            Dated July 6, 1971

Inventor(s) James W. Ross et al.

It is certified that error appears in the above-identified patent and that said Letters Patent are hereby corrected as shown below:

Column 5, line 17, the ionic identification "$CU^{++}$" should read -- $Cu^{++}$ --.

Signed and sealed this 22nd day of February 1972.

(SEAL)
Attest:

EDWARD M. FLETCHER, JR.          ROBERT GOTTSCHALK
Attesting Officer                  Commissioner of Patents